United States Patent
Laackmann et al.

(10) Patent No.: US 8,476,921 B2
(45) Date of Patent: Jul. 2, 2013

(54) METHOD FOR SUPPORTING A TIE OF A CHIP TO AN ELECTRONIC APPARATUS

(75) Inventors: Peter Laackmann, Munich (DE); Marcus Janke, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/239,740

(22) Filed: Sep. 22, 2011

(65) Prior Publication Data

US 2012/0182041 A1 Jul. 19, 2012

(30) Foreign Application Priority Data

Sep. 30, 2010 (DE) .......................... 10 2010 047 186

(51) Int. Cl.
*H03K 19/00* (2006.01)

(52) U.S. Cl.
USPC ...................................... 326/8; 326/9; 326/38

(58) Field of Classification Search
None
See application file for complete search history.

(56) References Cited

U.S. PATENT DOCUMENTS 7,941,673 B1 * 5/2011 Trimberger ................... 713/189
2006/0233360 A1 * 10/2006 Gammel et al. ................ 380/37

* cited by examiner

*Primary Examiner* — Anh Tran
(74) *Attorney, Agent, or Firm* — Murphy, Bilak & Homiller, PLLC

(57) ABSTRACT

A method for supporting a tie of a chip to an electronic apparatus includes generating once a chip-specific characteristic variable in a chip, reading out the chip-specific characteristic variable by the chip, and transmitting characteristic data representing the read-out characteristic variable of the chip to an electronic apparatus.

8 Claims, 1 Drawing Sheet

US 8,476,921 B2

METHOD FOR SUPPORTING A TIE OF A CHIP TO AN ELECTRONIC APPARATUS

PRIORITY CLAIM

This application claims priority to German Patent Application No. 10 2010 047 186.0 filed on 30 Sep. 2010, the content of said application incorporated herein by reference in its entirety.

TECHNICAL FIELD

The present application relates to supporting a tie of a chip to an electronic apparatus.

BACKGROUND

Used electronic components, in particular high-price components such as microcontrollers, for example, are increasingly being recycled. This can be eminently practical for cost reasons and in order to conserve resources. However, more and more electronic components are recycled "illegally". By way of example, the components are disassembled from used apparatuses that have previously been brought into corresponding countries, in particular countries with a low wage economy. These electronic components are then re-declared, if appropriate, in order to be sold again. In the process, the information is lost that the components have already been used and are subject for example to a higher probability of failure than new electronic components. Nevertheless, it has already demonstrably happened that such re-declared electronic components have been used in avionics or military technologies, which have very stringent reliability requirements for electronic components.

One possibility for solving this problem includes monitoring the entire logistics of used electronic components. This is very complex, expensive and implementable only with difficulty on account of present-day complex logistics systems. Furthermore, these components are often so-called "off-shelf products", which means that they may originate from a wide variety of sources, for example also from used apparatuses. This fact makes complete monitoring of the logistics virtually impossible.

SUMMARY

Embodiments described herein support a tie of a chip to an electronic apparatus. In one embodiment, a method for supporting a tie of a chip to an electronic apparatus includes: generating once a chip-specific characteristic variable in a chip; reading out the chip-specific characteristic variable by the chip; and transmitting characteristic data representing the read-out characteristic variable of the chip to an electronic apparatus. The method can be performed by a correspondingly designed chip. The chip can have a self-built-in functionality used to generate and define a state of the chip by means of the chip-specific characteristic variable. The chip-specific characteristic variable can advantageously be stored in programmable elements. The characteristic data can be generated during or after the reading-out of the chip-specific characteristic variable and based on the read-out chip-specific characteristic variable.

In another embodiment, an electronic apparatus includes a chip-specific characteristic variable. The chip-specific characteristic variable of the chip is generated by means of physical unclonable functions (PUFs). The advantage of using PUFs for generating a chip-specific characteristic variable arises from characteristics of the chip properties being utilized and the desired data being obtained therefrom. In this case, there is no need to incorporate any nonvolatile memory (NVM), but the values are not freely selectable.

In yet another embodiment, an electronic apparatus includes a chip-specific characteristic variable. The chip-specific characteristic variable of the chip is generated by means of nonvolatile memory values (NVM values). Using such an NVM approach yields unique values which can be stored, for example "unique identifiers" (UIDs), that is to say freely selectable values.

In a still another embodiment, an electronic apparatus includes a chip-specific characteristic variable of the chip. The chip-specific characteristic variable is generated by programming data received by the chip in programmable elements of the chip. The chip-specific characteristic variable can constitute a particular form of PUFs. No function which outputs a concrete value is realized here. Instead, a characteristic is measured and a value is given thereby. The circuit is possibly more complex to realize for this than for PUF.

In another embodiment, a method for supporting a tie of a chip to an electronic apparatus includes: receiving, by means of the chip, identification data transmitted by the electronic apparatus; comparing the received identification data with the characteristic data; and deactivating at least one function of the chip if the comparison reveals no correspondence of the received identification data to the characteristic data.

In another embodiment, a method for supporting a tie of a chip to an electronic apparatus includes: receiving characteristic data representing a chip-specific characteristic variable of a chip by means of an electronic apparatus; and programming the received characteristic data in programmable elements of the electronic apparatus.

In a further embodiment, a method for supporting a tie of a chip to an electronic apparatus includes: reading out the characteristic data programmed in the programmable elements; and transmitting the read-out characteristic data as identification data of the electronic apparatus to the chip.

In one embodiment, the chip includes a device operable to generate once a chip-specific characteristic variable in the chip, and further includes a device operable to read out the chip-specific characteristic variable within the chip, and further includes a transmitting device operable to transmit characteristic data representing the read-out characteristic variable of the chip to an electronic apparatus.

In another embodiment, the chip includes a device operable to receive identification data by means of the chip, which were transmitted by the electrical apparatus. The chip further includes another device operable to compare the received identification data with the characteristic data. At least one function of the chip is deactivated if the comparison reveals no correspondence of the received identification data to the characteristic data.

According to an embodiment of an electronic apparatus, the apparatus includes a receiving device operable to receive characteristic data by means of an electronic apparatus, which represent a chip-specific characteristic variable of a chip, and a programming device operable to program the received characteristic data in programmable elements of the electronic apparatus.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate cor

DETAILED DESCRIPTION

Figure 1:
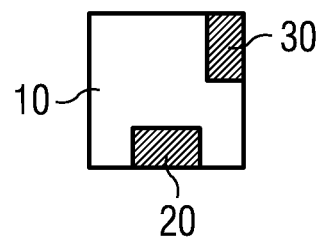
- FIG. 1 shows an exemplary embodiment of a chip.

FIG. 1 shows an embodiment of a chip 10 having an interface 20 and programmable elements 30. The interface 20 is connected to the programmable elements 30 within the chip 10. By means of an internal functionality built into the chip 10 for the programming of the programmable elements 30, the programmable elements 30 of the chip 10 can be programmed, and a chip-specific characteristic variable can thus be defined. The chip-specific characteristic variable is generally a technical feature and can be defined for example by the generation of "hardware watermarks" by means of physical unclonable functions (PUF) and/or with nonvolatile memory values (NVM). PUFs are preferably used in cryptography. A PUF can be realized in a physical hardware structure, which enables simple evaluation of values. The physical structures containing PUFs include many random components. The parameters of the components in turn are subject to production-dictated fluctuations and are thus as if it were random. However, the elements which play a part for this are well defined and are not randomly selected. In the NVM, which is distinguished by the fact that it is suitable for storing values over a long time, even if no voltage supply is present, randomly generated values can be stored, for example. This chip-specific characteristic variable can then be transmitted from the programmable elements to the interface of the chip 10.

Figure 2:
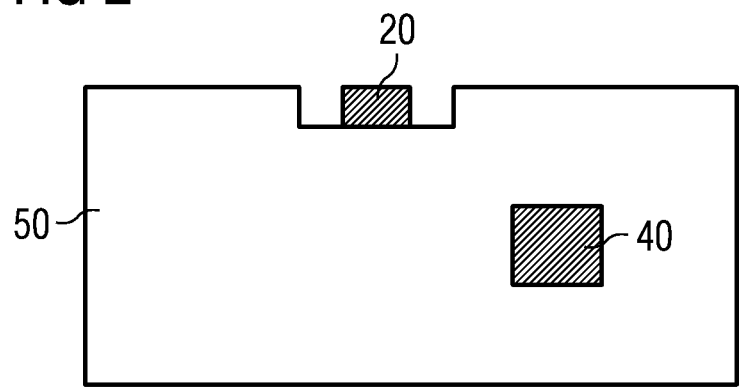
FIG. 2 shows a further exemplary embodiment of an electronic apparatus.

FIG. 2 shows an embodiment of an electronic apparatus 50 having an interface 20 and programmable elements 40. In the simplest case, the programmable elements 40 can be fuses. Internal values defined during the production of the electronic apparatus 50, for example, can be stored in the programmable elements 40. However, external values, for example transmitted characteristic data of a chip, which are readable via the interface 20, can also be stored in the programmable elements 40. The programmable elements 40 of the electronic apparatus 50 can also be replaced by a fixedly predetermined value, which is fixedly incorporated during production in the electronic apparatus 50. This fixedly predetermined value can then be transmitted via the interface 20 to a chip 10, for example, in order to program the programmable elements 30 of the chip 10.

Figure 3:
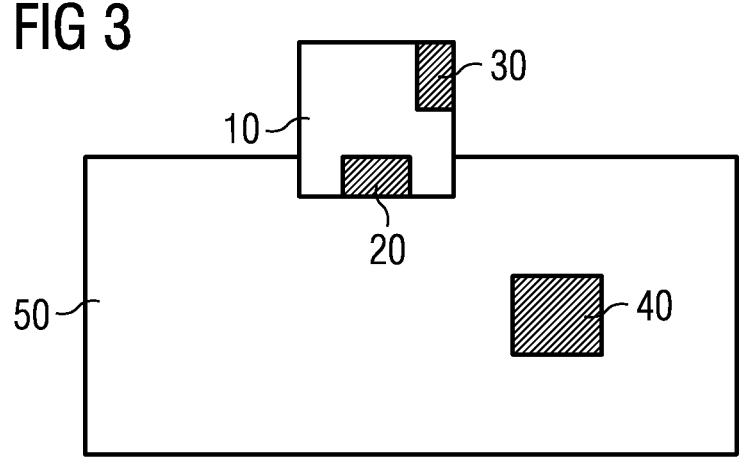
FIG. 3 shows an exemplary embodiment of a chip with an electronic apparatus connected via an interface, where the chip and the electronic apparatus exchange characteristic data via a method for supporting a tie of a chip to an electronic apparatus.

FIG. 3 shows an embodiment of a chip 10 having programmable elements 30. The chip 10 can be connected by means of an interface 20 to an electronic apparatus 50 via an interface 20 of the electronic apparatus 50. However, the chip 10 and the electronic apparatus 50 can also be directly connected to one another. FIG. 3 furthermore shows the programmable elements 40 of the electronic apparatus 50. The chip 10 has a chip-specific characteristic variable, which can be stored in the programmable elements 30 and can be read out by the chip 10 itself into so-called characteristic data. The electronic apparatus 50 to which the chip 10 is connected by means of the interface 20 can contain programmable elements 40, which can be connected to the chip 10 in production, for example. If the chip 10 is then operated for the first time after production, the chip 10 reads out the internal values of the chip-specific characteristic variable from the programmable elements 30 of the chip 10. The programmable elements 40 of the electronic apparatus 50 can then be programmed with the read-out characteristic values after they have been transmitted from the chip 10 to the electronic apparatus 50. Afterward, the chip 10 can lock itself and the chip-specific characteristic variable can thus be generated only once. Each time the electronic apparatus 50 is started, the chip 10 then reads out the values of the programmable elements 40 of the electronic apparatus 50, also designated as identification data, and compares this data with the chip-specific characteristic variable, or with the transmitted characteristic data of the chip 10, which are stored in the programmable elements 30 of the chip 10. If the values are identical, then the chip 10 is situated in its originally intended electronic apparatus 50. If the values are not identical, then the chip 10 is situated in an electronic apparatus deviating from the original electronic apparatus 50. The chip 10 can then preferably adjust one of its functions.

Alternatively, the programmable elements 30 of the chip 10 can be programmed with arbitrary external characteristic data by means of the functionality for programming the chip 10. The chip 10 stores the latter. Upon start-up of the chip 10 and the electronic apparatus 50 connected to the chip 10, the chip 10 compares the values stored in the programmable elements 40 of the electronic apparatus 50 with the characteristic data of the values stored in the chip 10 and characteristic data transmitted to the electronic apparatus 50 in the programmable elements 30. If these do not correspond, the chip 10 can adjust its function or generate an alarm.

A further embodiment includes an individual value of the electronic apparatus 50 being stored in the programmable elements 30 of the chip 10, which value was transmitted by the electronic apparatus 50 to the chip 10 in the form of characteristic data. In this embodiment, the programmable elements 40 of the electronic apparatus 50 are not necessarily provided, since the individual value of the electronic apparatus 50 is fixedly set. During a comparison of the value stored in the chip 10 with the fixedly set individual value of the electronic apparatus 50, it can be ascertained whether the original combination of the chip 10 and the electronic apparatus 50 is involved. If the values deviate, the chip 10 can adjust its function or generate an alarm.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for supporting a tie of a chip to an electronic apparatus, comprising:
   generating once a chip-specific characteristic variable in a chip;
   reading out the chip-specific characteristic variable by the chip;
   transmitting characteristic data representing the read-out characteristic variable of the chip to an electronic apparatus;
   receiving at the chip identification data transmitted by the electronic apparatus;
   comparing the received identification data with the characteristic data; and
   deactivating at least one function of the chip if the comparison reveals no correspondence of the received identification data to the characteristic data.

2. The method as claimed in claim 1, wherein the chip-specific characteristic variable of the chip is generated by physical unclonable functions.

3. The method as claimed in claim 1, wherein the chip-specific characteristic variable of the chip is generated by nonvolatile memory values.

4. The method as claimed in claim 1, wherein the chip-specific characteristic variable of the chip is generated by programming data received by the chip in programmable elements of the chip.

5. A chip, comprising:
   a first device operable to generate once a chip-specific characteristic variable in the chip;
   a second device operable to red out the chip-specific characteristic variable within the chip;
   a transmitting device operable to transmit characteristic data representing the read-out characteristic variable of the chip to an electronic apparatus;
   a third device operable to receive identification data via the chip, which were transmitted by the electrical apparatus; and
   a fourth device operable to compare the received identification data with the characteristic data and deactivate at least one function of the chip if the comparison reveals no correspondence of the received identification data to the characteristic data.

6. The chip as claimed in claim 5, wherein the first device is operable to generate once the chip-specific characteristic variable in the chip by physical unclonable functions.

7. The chip as claimed in claim 5, wherein the first device is operable to generate once the chip-specific characteristic variable in the chip by nonvolatile memory values.

8. The chip as claimed in claim 5, wherein the first device is operable to generate once the chip-specific characteristic variable in the chip by programming data received by the chip in programmable elements of the chip.

* * * * *